May 5, 1970 G. KIPER 3,509,806
SHUTTER-FLASH SYSTEM FOR PHOTOGRAPHIC CAMERAS
Filed Sept. 25, 1967 3 Sheets-Sheet 2
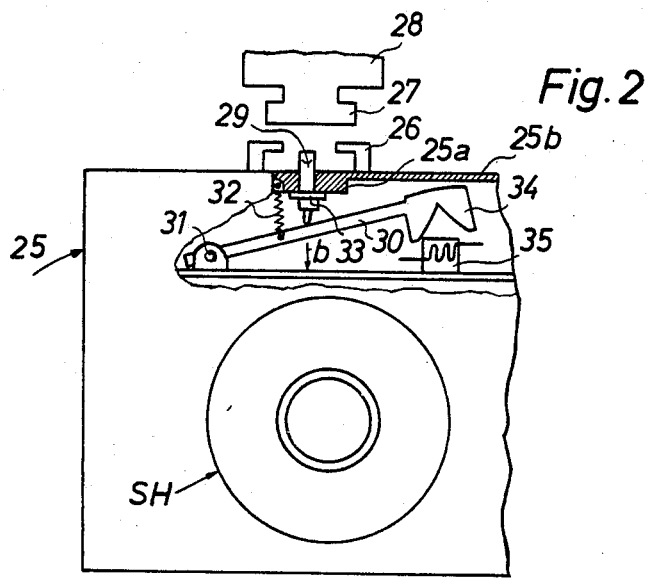
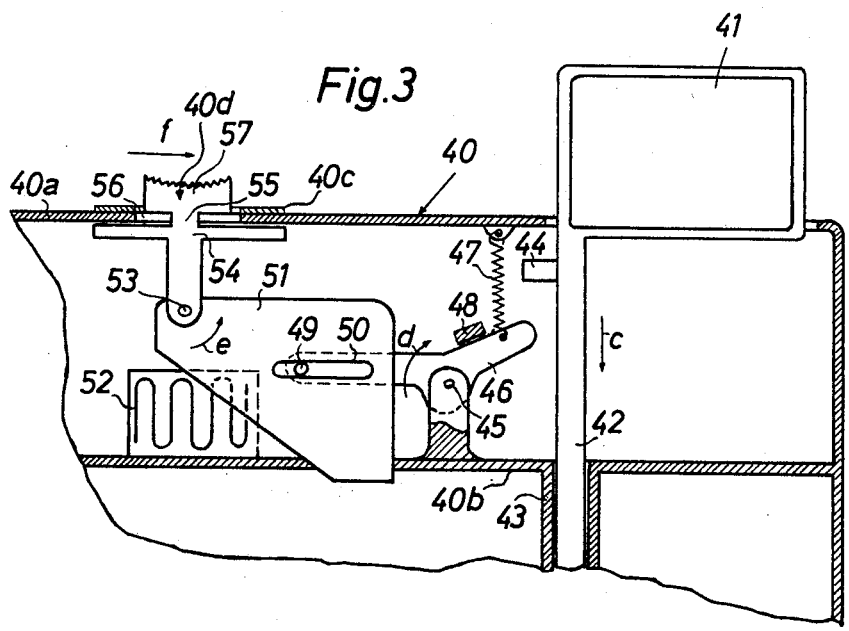
INVENTOR.
GERD KIPER
BY Michael S. Striker
Attorney May 5, 1970 G. KIPER 3,509,806
SHUTTER-FLASH SYSTEM FOR PHOTOGRAPHIC CAMERAS
Filed Sept. 25, 1967 3 Sheets-Sheet 3

INVENTOR.
GERD KIPER
BY Michael S. Striker,
Attorney

United States Patent Office

3,509,806
Patented May 5, 1970

---

3,509,806
SHUTTER-FLASH SYSTEM FOR PHOTOGRAPHIC
CAMERAS
Gerd Kiper, Ludersen, Germany, assignor to Agfa-
Gevaert Aktiengesellschaft, Leverkusen, Germany
Filed Sept. 25, 1967, Ser. No. 670,123
Claims priority, application Germany, Sept. 30, 1966,
A 53,631
Int. Cl. G01j 1/04
U.S. Cl. 95—10           16 Claims

ABSTRACT OF THE DISCLOSURE

A photographic camera for operation in daylight and with flash comprises a shutter which moves to open position in response to actuation of a trigger and returns to closed position with a delay which is a function of the intensity of scene light and a function of the position or condition of the flash unit, i.e., whether the flash unit is ready to produce a flash in response to opening of the shutter or whether the flash unit is idle or is detached from the camera body. When the flash unit is inoperative, an actuating member automatically connects in the electric circuit one of two resistors or capacitors or uncovers that portion of a light-sensitive receiver which is covered when the flash unit is in use. The camera can be set for operation in daylight with or without flash or with flash alone.

BACKGROUND OF THE INVENTION

The present invention relates to improvements in cameras with built-in or detachable flash units. More particularly, the invention relates to improvements in cameras wherein the delay with which the shutter closes is determined by an electric delay circuit.

It is already known to provide the electric delay circuit which closes the shutter and/or selects the size of the aperture in a photographic camera with a light-sensitive receiver which changes the delay as a function of the intensity of scene light when the subject is illuminated by daylight or by artificial light which is furnished by a flash bulb. However, the delay circuit which furnishes satisfactroy exposure times as a function of the intensity of scene light when the exposures are made in daylight is less satisfactory when the light is furnished by a flash bulb. This is attributed to the fact that the intensity of light varies continuously during an exposure with flash whereby the inertia of mechanical moving parts in the shutter and the inertia of the light-sensitive receiver prevent sufficiently rapid adjustments during operation with flash.

SUMMARY OF THE INVENTION

It is an object of my invention to provide a photographic camera with an electric delay circuit which can furnish satisfactory exposure times in daylight as well as when the subject or scene is illuminated in response to firing of a flash bulb.

Another object of the invention is to provide a delay circuit which can operate conventional shutters as well as shutters which also act as diaphragms.

A further object of the invention is to provide an electric delay circuit which is automatically adjusted in response to placing of a flash bulb in firing position.

An additional object of the invention is to provide a camera which embodies the above outlined delay circuit and which is constructed and assembled in such a way that the operator need not make any adjustments for the sole purpose of changing the characteristics of the delay circuit when the camera is set for operation in daylight, with flash alone or in daylight and with flash.

A concomitant object of the invention is to provide a photographic camera which can employ built-in or detachable flash units with one or more flash bulbs.

Still another object of the invention is to provide a camera wherein the delay circuit which closes the shutter can be influenced by factors other than the intensity of scene light and/or the condition of the flash unit, particularly by the film speed.

Briefly outlined, the invention is embodied in a photographic camera for operation in daylight and with flash which comprises a housing, shutter means provided in the housing and movable between open and closed positions, trigger means provided in or on the housing and operative to move or to effect movement of shutter means to open position, a built-in or detachable flash unit for operation with flash bulbs and including a portion which is movable between operative and inoperative positions, and an electric delay circuit provided in the housing and comprising closing means for effecting movement of shutter means to closed position with a variable delay following operation of the trigger means, first exposure time determining means including light-sensitive receiver means for changing the delay as a function of the intensity of scene light, and second exposure time determining means for respectively changing the delay to a first extent and to a second extent in the inoperative and operative positions of the aforementioned portion of the flash unit. The second exposure time determining means may effect the delay with which the shutter is closed through the intermediary of the first exposure time determining means, for example, by covering different portions of the light-sensitive receiver means for scene light. Alternatively, the second exposure time determining means can connect in the delay circuit one of two different capacitors or resistors in response to movement of the aforementioned portion of the flash unit to inoperative or operative position. Such portion of the flash unit may include a multiple flash bulb holder, the foot of a detachable flash unit, or a reflector for use with single flash bulbs which is movable between extended or operative and retracted or inoperative positions.

The novel features which are considered as characteristic of the invention are set forth in particular in the appended claims. The improved camera itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is a similar view of a second camera with a detachable flash unit;

FIG. 3 is a fragmentary vertical sectional view of a third camera with a built-in flash unit for individual flash bulbs.

DESCRIPTION OF THE PREFERRED EMBODIMENTS

Figure 1:
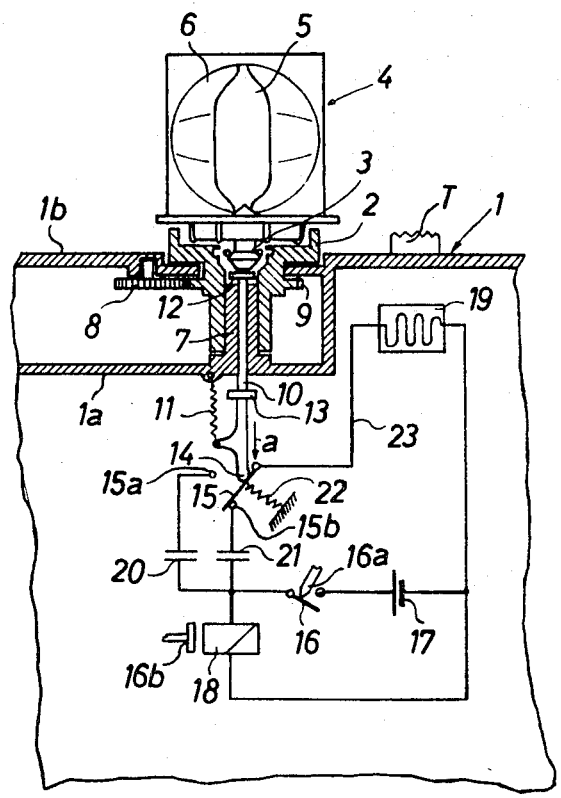
FIG. 1 is a fragmentary vertical sectional view of a camera with a built-in flash unit which embodies one form of my invention.

The camera of FIG. 1 comprises a housing or body 1 having a top wall 1b provided with an opening for an indexible socket 2. The latter forms part of a built-in flash unit and can accommodate and releasably hold the foot 3 of a multiple flash bulb holder 4 of the type commonly known as "Flashcube" and having a set of four flash bulbs 5 each located in front of a reflector 6. The socket 2 is rotatable on a sleeve 7 which is rigid with an internal partition 1a of the housing 1 and the socket is integral with a gear 9 meshing with an indexing gear 8 which can be turned by hand or is coupled to the film transporting mechanism so that the holder 4 is indexed in automatic response to transport of film by the length of a frame.

The sleeve 7 accommodates a vertically reciprocable actuating member or rod 10 which is biased upwardly by a spring 11 so that its disk-shaped head 12 normally extends into a recess provided in the top face of the socket 2. When the foot 3 is inserted into this recess, the rod 10 is pushed downwardly in the direction indicated by an arrow a and assumes the position shown in FIG. 1. A stop collar 13 of the rod 10 abuts against the underside of the partition 1a when the foot 3 is withdrawn from the socket 2. The lower end portion 14 of the rod 10 constitutes a trip which serves to actuate a two-way switch having a moving contact 15 biased by a spring 22 so that it normally bears against a first fixed contact 15a. When the foot 3 is inserted into the socket 2, the trip 14 moves the contact 15 into engagement with a second fixed contact 15b. The two-way switch including the contacts 15, 15a, 15b and the actuating member or rod 10 constitute two components of an electric delay or retard circuit for the shutter. Certain details of the delay circuit (including its closing electromagnet 18) and the shutter of my camera may be constructed and assembled in a manner as illustrated, for example, in FIG. 4 of French Pat. No. 1,410,597. The delay circuit further comprises a master switch 16 which is mechanically closed prior to making of an exposure and is opened by a portion 16a of the shutter while the latter moves to open position. The master switch 16 is connected in series with a source 17 of electrical energy and with the electromagnet 18 which latter serves as a means for closing the shutter. A branch 23 of the delay circuit includes a light-senstive receiver 19 which is connected in parallel with the master switch 16 and energy source 17 and in series with the two-way switch 15, 15a, 15b. The receiver 19 may be constituted by a light-sensitive resistor. The characteristics of the delay circuit can be changed by the two-way switch in that the latter's moving contact 15 is adapted to connect in series with the light-sensitive receiver 19 a first capacitor 20 (when the contact 15 engages the contact 15a) or a second capacitor 21 (when the moving contact 15 engages the fixed contact 15b). The capacity of the capacitor 20 is different from that of the capacitor 21.

The operation is as follows:

FIG. 1 illustrates the camera in a position ready to make an exposure with flash illumination. The foot 3 of the multiple flash bulb holder 4 is fully inserted into and is yieldably retained by the socket 2 so that the rod 10 assumes its lower end position and the trip 14 maintains the moving contact 15 of the two-way switch in engagement with the contact 15b, i.e., the light-sensitive receiver 19 is connected in series with the capacitor 21.

The user thereupon actuates the trigger T by simultaneously closing the master switch 16 to energize the electromagnet 18 which then holds a compoent part 16b of the shutter to prevent closing of the shutter. As soon as the shutter begins to open, the shutter portion 16a opens the master switch 16 whereby the capacitor 21 is charged through the light-sensitive receiver 19 and can discharge through the electromagnet 18. The strength of the current flowing through the winding of the electromagnet 18 depends on the resistance of the receiver 19, i.e., it is a function of the intensity of scene light reaching the receiver, and the current will cause a more rapid discharge or a delayed discharge of the capacitor 21. This, in turn, determines the exact moment when the electromagnet 18 is deenergized and permits closing of the shutter.

If the foot 3 is withdrawn from the socket 2, the spring 11 returns the stop collar 13 into abutment with the partition 1a and the trip 14 permits the spring 22 to move the moving contact 15 against the fixed contact 15a so that the light-sensitive receiver 19 is connected in series with the capacitor 20. The camera is then ready to make an exposure without flash illumination, and the exposure is made in the same way as described above with the sole exception that the capacitor 20 influences the delay with which the electromagnet 18 effects closing of the shutter. It will be seen that, in the camera of FIG. 1, a change in capacitance influences the delay circuit when the camera is adjusted from operation with flash to operation in daylight or vice versa.

In the just described camera, the parts 2–6 constitute a built-in flash unit having a portion (multiple flash bulb holder 4) which is movable between operative and inoperative positions; the electromagnet 18 constitutes the closing means of the delay circuit; the light-sensitive receiver 19 forms part of a first exposure time determining unit of the delay circuit and serves to select with which the electromagnet 18 effects closing of the shutter (parts 16, 16b) as a function of the intensity of scene light; and the parts 10, 15, 15a, 15b, 20, 21, 22 constitute a second exposure time determining unit which can influence the aforementioned delay in dependency on the position of the holder 4 in the built-in flash unit. Thus, the delay circuit is immediately adjusted in automatic response to placing of the flash unit to operative or inoperative position, namely, in response to insertion or withdrawal of the foot 3 of a multiple flash bulb holder 4 from the socket 2. It is evident that the basic operation of the shutter-flash system in my camera is not changed if the socket 2 is constructed to accommodate a single flash bulb at a time and is non-rotatably installed in or on the housing 1.

FIG. 2 shows the housing or body 25 of a second photographic camera whose top wall 25b carries an accessory or clip 26 adapted to receive the foot 27 of a conventional flash unit 28 which utilizes flash bulbs. The upper end of a pin- or rod-shaped actuating member 29 normally extends into the interior of the shoe 26 and is guided by a boss 25 of the top wall 25b. The rod 29 is reciprocable in a bore of the boss 25a and its lower end bears against a lever 30 which is turnable on a horizontal pivot pin 31 installed in a portion of the housing 25. The lever 30 is biased in a counterclockwise direction by a spring 32 and normally assumes the position shown in FIG. 2 in which a stopcollar 33 of the rod 29 bears against the underside of the boss 25a. The free end of the lever 30 carries a mask 34 in the form of a vane or blade which can be moved into and away from registry with a light-sensitive receiver 35. The latter is the functional equivalent of the light-sensitive receiver 19 shown in FIG. 1. The mask 34 replaces the capacitors 20, 21 of FIG. 1.

FIG. 2 illustrates the camera in a position its parts assume prior to making an exposure in daylight. The foot 27 of the flash unit 28 is withdrawn from the shoe 26

(i.e., the flash unit 28 is in inoperative position) so that the actuating rod 29 assumes its upper end position in which its stop shoulder 33 bears against the boss 25a. The mask 34 is biased by spring 32 to its upper end position in which it is held out of registry with the light-sensitive receiver 35. If the operator wishes to make an exposure with flash, the foot 27 is inserted into the shoe 26 to place the flash unit 28 in operative position whereby the actuating rod 29 moves downwardly and turns the lever 30 in a clockwise direction to tension the spring 32 and to move a portion of the mask 34 in front of the light-sensitive receiver 35. The upper end of the rod 29 is provided with a suitably inclined cam face (not shown) which is depressed by the foot 27 during insertion of this foot into the shoe 26. In this embodiment of the present invention, the characteristics of the delay circuit are changed by changing the characteristic curve of the light-sensitive receiver 35. This compensates for different conditions which prevail during operation in daylight and during operation with flash illumination.

The receiver 35 constitutes a first exposure time determining unit of the delay circuit and is fully exposed to scene light when the camera is set to make exposures without flash. The parts 29, 30, 32, 34 constitute a second exposure time determining unit of the delay circuit and influence the delay with which the closing means of the circuit effects closing of the shutter SH in dependency on the condition of the flash unit 28, i.e., whether or not the foot 27 is inserted into the shoe 26. The second unit influences the delay with which the shutter closes through the intermediary of the first unit.

Referring to FIG. 3, there is shown a third camera which is similar to the camera of FIG. 2. This third camera comprises a housing or body 40 having a top wall 40a and including a built-in flash unit which employs individual flash bulbs. The flash unit includes a vertically reciprocable reflector 41 having a rail 42 which is guided in a bearing sleeve 43 of the housing 40. FIG. 3 shows the flash unit in operative position, i.e., the reflector 41 has been lifted to extended position at a level above the top wall 40a. The rail 42 carries a projection 44 which can rock a two-armed actuating lever 46 mounted on a horizontal pivot pin 45 installed in a bracket extending upwardly from an internal partition 40b of the housing 40. The actuating lever 46 is biased by a spring 47 which tends to maintain its right-hand arm in abutment with a fixed stop 48. The left-hand arm of the lever 46 carries a pin 49 extending into an elongated slot 50 provided in a mask 51 which is analogous to the mask 34 of FIG. 2. The mask 51 may consist of opaque material or may constitute a light filter. In the position shown in FIG. 3, this mask 51 overlies a portion of a light-sensitive receiver 52 in the delay circuit for the shutter. A film speed compensator 54 is pivotally connected with the mask 51 by by means of a horizontal pin 53 and is reciprocable in an opening 56 provided in the top wall 40a. The compensator 54 comprises a neck portion 55 which is narrower than the opening 56 so that it can be moved in parallelism with the wall 40a in and counter to the direction indicated by an arrow f. A knurled or serrated handgrip portion 57 of the compensator 54 normally extends above the top wall 40a. A film speed dial 40c on the outer side of the top wall 40a cooperates with an index 40d of the handgrip portion 57 to indicate different film sensitivities. The dial 40c can be omitted if the graduations indicating different film sensitivities are applied directly to the exposed surface of the top wall 40.

The camera of FIG. 3 is operated as follows:

When the user wishes to make an exposure with flash, the reflector 41 is moved to the illustrated (extended or operative) position whereby its projection 44 moves away from the right-hand arm of the actuating lever 46 and the spring 47 is free to contract so as to maintain the lever in abutment with the stop 48. The mask 51 covers a portion of the light-sensitive receiver 52. The position of the compensator 54 is indicative of the film sensitivity. If the user wishes to make an exposure in daylight by using a film of the same sensitivity, the reflector 41 is depressed in the direction indicated by an arrow c to assume an inoperative position whereby the projection 44 turns the actuating lever 46 and causes the pin 49 to lift the right-hand portion of the mask 51, i.e., to turn the mask on the pivot pin 53 in the direction indicated by an arrow e. The direction of pivotal movement of the actuating lever 46 in response to depression of the reflector 41 is indicated by an arrow d. The mask 51 then exposes a larger portion of the light-sensitive receiver 52 to scene light.

If the film is replaced by one of different sensitivity, the operator must shift the compensator 54 in or counter to the direction indicated by arrow f so as to place the index 40d into registry with appropriate graduation on the dial 40c. Such movement of the compensator 54 also changes the position of the mask 51 with reference to the light-sensitive receiver 52 because the pivot pin 53 causes the mask to move its slot 50 with reference to the pin 49 of the actuating lever 46. Thus, the compensator 54 can change the position of the mask 51 with reference to the receiver 52 irrespective of the position of the reflector 41, i.e., regardless of whether the user wishes to make exposures in daylight or with flash illumination.

The camera of FIG. 3 is more versatile than the camera of FIG. 2 because the delay circuit for the shutter can be influenced not only by the setting of camera for operation in daylight or with flash but also by at least one additional factor, namely, by the sensitivity of film which is being used for a particular series of exposures. Furthermore, that element (mask 51) which influences the delay with which the shutter closes in response to changing from operation in daylight to operation with flash also serves as a means for adjusting the delay in accordance with the sensitivity of film.

In this embodiment of my invention, the light-sensitive receiver 52 forms part of a first exposure time determining unit in the delay circuit and the parts 46, 47, 51 constitute a second exposure time determining which influences the delay with which an electromagnet of the circuit closes or permits closing of the shutter as a function of the condition of the built-in flash unit, i.e., whether the reflector of the flash unit is held in extended or retracted position. The compensator 54 forms part of a third exposure time determining unit which influences the delay in dependency on the film speed.

Figure 4:
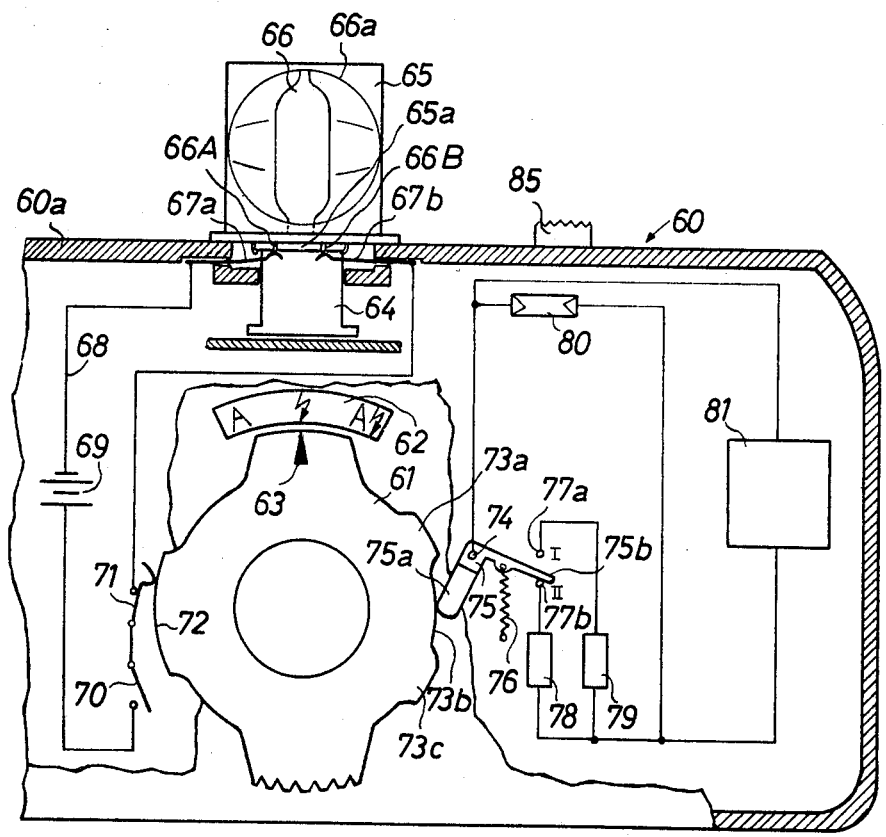
FIG. 4 is a fragmentary vertical sectional view of a further camera with a built-in flash unit.

Referring finally to FIG. 4, there is shown a portion of a fourth camera having a housing or body 60 whose top wall 60a has an opening for an indexible socket 64 adapted to receive the foot of a multiple flash bulb holder 65 having four flash bulbs 66 located in front of reflectors 66a and an insulating base 65a supporting four sets or pairs of electrical terminals 66A, 66B, one pair for each flash bulb 66. The top wall 60a carries two fixed terminals 67a, 67b serving to automatically engage the terminals 66A, 66B of that flash bulb 66 which faces the subject and is ready to be fired in response to completion of the built-in flash circuit 68.

The camera of FIG. 4 further comprises a manually operable selector 61 having an index or marker 63 movable into registry with selected graduations on a fixed scale or dial 62 provided on the front or rear wall of the housing 60. The symbol or graduation A on the dial 62 indicates that the camera is set for automatic exposure in daylight; the median graduation resembles a thunderbolt and indicates that the camera is set for operation with artificial illumination (flash bulbs 66); and the rightmost graduation includes two symbols which indicate that the camera is set for automatic exposure in daylight but with additional illumination furnished by a flash bulb.

The terminals 67a, 67b are connected in series with a source 69 of electrical energy, a normally open synchronizing switch 70 and a normally open interrupter switch 71 which can be closed by a cam or trip 72 of the selector 61. The configuration of the cam 72 is such that the interrupter switch 71 is closed when the index 63 registers with the median or right-hand graduation on the dial 62, i.e., when the camera is set for operation with flash.

The selector 61 comprises a second cam including two projections or lobes 73a, 73c flanking a recess or depression 73b. The second cam of the selector 61 cooperates with a two-armed actuating lever 75 which is turnable on a fixed horizontal pivot pin 74 and is biased by a spring 76 which causes its left-hand arm 75a to bear against the actuating member. The right-hand arm 75b is analogous to the movable contact 15 of the two-way switch in the delay circuit of the camera shown in FIG. 1 and is movable into engagement with either one of two fixed contacts 77a, 77b. The left-hand arm 75a of the lever 75 preferably consists of insulating material. The right-hand arm 75b conducts current and is connected in series with a light-sensitive receiver 80. The function of the two-way switch 75b, 77a, 77b is to connect in the delay circuit one of two fixed resistors 78, 79 so that the resistors 78 or 79 is connected in parallel with the light-sensitive receiver 80. The remaining component parts of the delay circuit are indicated by a box 81 and include a closing electromagnet for the shutter.

FIG. 4 illustrates the camera in a position for operation with flash. The trip 72 of the selector 61 maintains the interrupter switch 71 in closed position. The arm 75a extends into the recess 73b whereby the spring 76 urges the arm 75b to the position II, i.e., into engagement with the fixed contact 77b to connect the register 78 in parallel with the light-sensitive receiver 80. The synchronizing switch 70 closes in response to depression of the trigger 85 whereby the flash bulb 66 is fired and illuminates the subject or scene. The delay circuit delays closing fo the shutter (which opens in response to depression of the trigger 85) to the extent determined by the receiver 80 and resistor 78 whose resistance is selected in advance so as to insure proper exposure with flash.

If the operator wishes to make an exposure in daylight, the index 63 of the selector 61 is moved into registry with graduation A on the dial 62 whereby the trip 72 allows the interrupter switch 71 to open. Thus, the flash bulb 66 cannot be fired even if the synchronizing switch 70 is closed in response to depression of the trigger 85. The delay with which the shutter closes is determined by the delay circuit as a function of the resistance of the receiver 80 and resistor 79 because, when the index 63 registers with the graduation A, the lobe 73c of the selector 61 turns the actuating lever 75 in a counter-clockwise direction and maintains the movable contact 75b in engagement with the fixed contact 77a (position I of the lever 75). The resistor 79 is then connected in parallel with the light-sensitive receiver 80, and its resistance is such that the camera can make proper exposures in daylight. The delay with which the circuit permits closing of the shutter then depends on the intensity of scene light which reaches the receiver 80 and on the resistance of the resistor 79. The multiple flash bulb holder 65 need not be detached from the socket 64 because the interrupter switch 71 is open as long as the index 63 registers with the graduation or symbol A on the dial 62.

If the user wishes to make an exposure in daylight and with flash illumination, the index 63 is moved into registry with the rightmost graduation on the dial 62. The trip 72 closes the interrupter switch 71 and the lobe 73a moves the actuating lever 75 to the position I in which the movable contact 75b engages the fixed contact 77a to connect the resistor 79 in parallel with the light-sensitive receiver 80. The flash bulb 66 is fired in response to depression of the trigger 85 which closes the synchronizing switch 70. The delay with which the circuit closes the shutter is then a function of the intensity of scene light impinging upon the receiver 80 and also a function of the resistance of the resistor 79. Light furnished by the bulb 66 can be used to soften the shadows but such artificially produced light contributes little to the intensity of scene light which controls the resistance of the light-sensitive receiver 80.

In the camera of FIG. 4, the flash unit includes the circuit 68, the socket 64 and the flash bulb holder 65. The first exposure time determining unit includes the light-sensitive receiver 80 and the second exposure time determining unit of the delay circuit includes the actuating lever 75, the two-way switch including the contacts 75b, 77a, 77b, and the resistors 78, 79. The selector 61 causes the actuating member 75 to actuate the two-way switch in response to closing or opening of the interrupter switch 71 which constitutes a portion of the flash unit and whose open and closed positions respectively correspond to its inoperative and operative positions.

It will be seen that, in each of the four illustrated embodiments, the second exposure time determining unit influences the delay with which the close means (e.g., the electromagnet 18 of FIG. 1) effects closing of the shutter through the intermediary of the light-sensitive receiver. Thus, in FIG. 1, the receiver 19 is connected in series with the capacitor 20 or 21; in FIG. 2, the mask or filter 34 can cover different portions of the receiver 35 from scene light; in FIG. 3, the mask or filter 51 can cover different portions of the receiver 52 from scene light; and in FIG. 4, the receiver 80 can be connected in parallel with the resistor 78 or 79.

The improved camera is susceptible of many additional modifications without departing from the spirit of my invention. For example, the camera may employ any desired type of shutter and many other types of closing means for the shutter. Furthermore, the delay circuit can also be influenced by other factors, not only by changes from operation with flash to operation with daylight, for example, by the sensitivity of film in a manner as described in connection with FIG. 3 or in another suitable way, by changes in the filter factor and/or others. Such additional factors can influence the delay circuit or the shutter through the intermediary of the first and/or second exposure time determining unit.

Without further analysis, the foregoing will go fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is set forth in the appended claims.

What is claimed is:

1. In a photographic camera for operation in daylight and artificial light, a combination comprising a housing; a shutter mounted in said housing and movable between open and closed positions; trigger means provided in said housing and operative to effect movement of said shutter to open position; a flash unit including a portion movable between operative and inoperative positions; an electric circuit provided in said housing and comprising closing means for effecting movement of said shutter to closed position with a variable delay following operation of said trigger means, first exposure time determining means including light-sensitive receiver means for influencing said delay as a function of the intensity of scene light, and second exposure time determining means for respectively influencing said delay to a first and to a second extent in the inoperative and operative positions of said portion of the flash unit; and third exposure time determining means for influencing said delay as a function of at least one factor other than the position of said portion of the flash unit and the intensity of scene light, said third exposure time determining means comprising means for changing the characteristic of said light-sensitive receiver means.

2. A combination as defined in claim 1, wherein said flash unit further comprises a socket which is indexible with reference to said housing and said portion of the flash unit includes a multiple flash bulb holder insertable into and withdrawable from said socket to thus respectively assume said operative and inoperative positions thereof, said second exposure time determining means comprising actuating means movable from a first to a second position in response to insertion of said holder into said socket whereby said second exposure time determining means influences said delay to said second extent.

3. A combination as defined in claim 1, wherein said portion of the flash unit includes reflector means movable with reference to said housing between extended and retracted positions which respectively correspond to said operative and inoperative positions, said second exposure time determining means comprising actuating means which respectively assumes first and second positions in response to movement of said reflector means to retracted and extended positions whereby said second exposure time determining means respectively influences said delay to said first and said second extent.

4. A combination as defined in claim 1, wherein said housing comprises a shoe and said portion of the flash unit includes a foot which is insertable into and withdrawable from said shoe to respectively assume said operative and inoperative positions, said second exposure time determining means comprising actuating means movable from a first to a second position in response to withdrawal of said foot from said shoe whereby said second exposure time determining means influences said delay to said first extent.

5. A combination as defined in claim 1, wherein said flash unit is built into said housing and said portion thereof includes interrupter switch means moveable between open and closed positions which respectively correspond to said inoperative and operative positions, and further comprising manually operable selector means movable with reference to said housing to a first position to close said switch means, said second exposure time determining means comprising actuating means movable from a first to a second position in response to movement of said selector means to first position whereby said second exposure time determining means influences said delay to said second extent.

6. A combination as defined in claim 1, wherein said second exposure time determining means comprises two-way switch means and actuating means for said switch means, said actuating means being responsive to movement of said portion of the flash unit between said operative and inoperative positions to actuate said switch means.

7. A combination as defined in claim 1, wherein said factor is the film speed.

8. A combination as defined in claim 1, wherein said second exposure time determining means comprises means for changing the characteristic of said light-sensitive receiver means.

9. A combination as defined in claim 1, wherein said second exposure time determining means comprises a member movable with reference to said light-sensitive receiver means between a plurality of positions in each of which a differently dimensioned portion of said receiver means is exposed to scene light.

10. A combination as defined in claim 9, wherein said member is an opaque mask.

11. A combination as defined in claim 9, wherein said member constitutes a light filter.

12. In a photographic camera for operation in daylight and artificial light, a combination comprising a housing; a shutter mounted in said housing and movable between open and closed positions; trigger means provided in said housing and operative to effect movement of said shutter to open position; a flash unit built into said housing and including a portion movable between operative and inoperative positions, said portion of the flash unit including interrupter switch means movable between open and closed positions which respectively correspond to said inoperative and operative positions; an electric circuit provided in said housing and comprising closing means for effecting movement of said shutter to closed position with a variable delay following operation of said trigger means, first exposure time determining means including light-sensitive receiver means for influencing said delay as a function of the intensity of scene light, and second exposure time determining means for respectively influencing said delay to a first and to a second extent in the open and closed positions of said switch means; and manually operable selector means movable with reference to said housing to a first position to close said switch means, said second exposure time determining means comprising actuating means movable from a first to a second position in response to movement of said selector means to first position whereby said second exposure time determining means influences said delay to said second extent.

13. A combination as defined in claim 12, wherein said selector means effects opening of said switch means when the camera is set to make exposures in daylight.

14. A combination as defined in claim 13, wherein said selector means is movable to a second position in which it closes said switch means and maintains said actuating means in first position so that the camera can be used to make exposures in daylight with flash illumination.

15. In a photographic camera for operation in daylight and artificial light, a combination comprising a housing; a shutter mounted in said housing and movable between open and closed positions; trigger means provided in said housing and operative to effect movement of said shutter to open position; a flash unit including a portion movable between operative and inoperative positions; and an electric circuit provided in said housing and comprising closing means for effecting movement of said shutter to closed position with a variable delay following operation of said trigger means, first exposure time determining means including light-sensitive receiver means for influencing said delay as a function of the intensity of scene light, and second exposure time determining means for respectively influencing said delay to a first and to a second extent in the inoperative and operative positions of said portion of the flash unit, said second exposure time determining means comprising two-way switch means, actuating means for said switch means, said actuating means being responsive to movement of said portion of said flash unit between said operative and inoperative positions to actuate said switch means, and first and second capacitors having different capacities, said switch means respectively connecting said first and second capacitors into said circuit in the operative and inoperative positions of said portion of the flash unit.

16. In a photographic camera for operation in daylight and artificial light, a combination comprising a housing; a shutter mounted in said housing and movable between open and closed positions; trigger means provided in said housing and operative to effect movement of said shutter to open position; a flash unit including a portion movable between operative and inoperative positions; and an electric circuit provided in said housing and comprising closing means for effecting movement of said shutter to closed position with a variable delay following operation of said trigger means first exposure time determining means including light-sensitive receiver means for influencing said delay as a function of the intensity of scene light, and second exposure time determining means for respectively influencing said delay to a first and to a second extent in the inoperative and operative positions of said portion of the flash unit, said second exposure time determining means comprising two-way switch means, actuating means for said switch means, said actuating means being responsive to movement of said portion of the flash unit between operative and inoperative positions to actuate said switch means, and first and second resistors having different resistances, said switch means respectively connecting said first and second resistors in parallel with said receiver means in the operative and inoperative positions of said portion of the flash unit.

References Cited

UNITED STATES PATENTS

| | | |
|---|---|---|
| 3,205,797 | 9/1965 | Land et al. |
| 3,205,801 | 9/1965 | Peterson _____ 95—11.5 |
| 3,205,803 | 9/1965 | Burgarella et al. |
| 3,208,363 | 9/1965 | Easterly et al. _____ 95—11.5 |
| 3,273,483 | 9/1966 | Weidner et al. |
| 3,318,215 | 5/1967 | Schiks _____ 95—11.5 |
| 3,374,720 | 3/1968 | Harvey _____ 95—11.5 |
| 3,379,107 | 4/1968 | Lieser et al. |

NORTON ANSHER, Primary Examiner

R. W. ADAMS, Assistant Examiner